United States Patent
Arbuckle et al.

(10) Patent No.: US 10,633,072 B1
(45) Date of Patent: Apr. 28, 2020

(54) METHODS FOR POSITIONING MARINE VESSELS

(71) Applicant: Brunswick Corporation, Mettawa, IL (US)

(72) Inventors: Jason S. Arbuckle, Horicon, WI (US); Andrew J. Przybyl, Berlin, WI (US); Steven J. Andrasko, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 5 days.

(21) Appl. No.: 16/028,019

(22) Filed: Jul. 5, 2018

(51) Int. Cl.
| B63H 21/22 | (2006.01) |
| B63H 25/42 | (2006.01) |
| B63H 21/21 | (2006.01) |
| G05D 1/02 | (2020.01) |

(52) U.S. Cl.
CPC .......... *B63H 21/22* (2013.01); *B63H 21/213* (2013.01); *B63H 25/42* (2013.01); *G05D 1/0206* (2013.01)

(58) Field of Classification Search
CPC .... B63H 25/04; G05D 1/0206; G05D 1/0212; G05D 1/0217; G05D 1/0223
See application file for complete search history.

(56) References Cited

U.S. PATENT DOCUMENTS

| 2,360,361 A | 10/1944 | Mountbatten |
| 2,585,502 A | 2/1952 | Schneider |
| 2,775,328 A | 12/1956 | Yokel |
| 3,145,683 A | 8/1964 | Kolb et al. |
| 3,177,348 A | 4/1965 | Daniloff |
| 3,187,704 A | 6/1965 | Shatto, Jr. et al. |
| 3,688,252 A | 8/1972 | Thompson |

(Continued)

FOREIGN PATENT DOCUMENTS

| DE | 906907 | 3/1954 |
| EP | 423901 | 4/1991 |

(Continued)

OTHER PUBLICATIONS

Arbuckle et al., "Station Keeping Methods," Unpublished U.S. Appl. No. 15/425,184, filed Feb. 6, 2017.

(Continued)

*Primary Examiner* — Andrew Polay
(74) *Attorney, Agent, or Firm* — Andrus Intellectual Property Law, LLP

(57) ABSTRACT

A method for positioning a marine vessel includes receiving a measured actual position of the vessel and determining a first error between the actual position of the vessel and a desired target position of the vessel. In response to the first error being in a fore/aft direction of the vessel, the method includes commanding a first subset of marine propulsion devices in a plurality of marine propulsion devices to produce thrust to minimize the first error in the fore/aft direction, as appropriate, while a remainder of the marine propulsion devices in the plurality do not produce thrust. The method thereafter includes commanding the first subset of marine propulsion devices to cease producing thrust. The method may also include selecting whether to actuate all marine propulsion devices in the plurality of marine propulsion devices or a first subset thereof based on a magnitude and a direction of the first error.

19 Claims, 6 Drawing Sheets

(56) References Cited

U.S. PATENT DOCUMENTS

| | | |
|---|---|---|
| 3,715,571 A | 2/1973 | Braddon |
| 3,771,483 A | 11/1973 | Bond |
| 4,009,678 A | 3/1977 | North |
| 4,220,111 A | 9/1980 | Krautkremer et al. |
| 4,253,149 A | 2/1981 | Cunningham et al. |
| 4,257,718 A | 3/1981 | Rosa et al. |
| 4,428,052 A | 1/1984 | Robinson et al. |
| 4,513,378 A | 4/1985 | Antkowiak |
| 4,519,335 A | 5/1985 | Krautkremer et al. |
| 4,691,659 A | 9/1987 | Ito et al. |
| 4,769,773 A | 9/1988 | Shatto, Jr. |
| 4,939,661 A | 7/1990 | Barker et al. |
| 4,975,709 A | 12/1990 | Koike |
| 5,031,561 A | 7/1991 | Nilsson |
| 5,090,929 A | 2/1992 | Rieben |
| 5,108,325 A | 4/1992 | Livingston et al. |
| 5,172,324 A | 12/1992 | Knight |
| 5,202,835 A | 4/1993 | Knight |
| 5,331,558 A | 7/1994 | Hossfield et al. |
| 5,362,263 A | 11/1994 | Petty |
| 5,386,368 A | 1/1995 | Knight |
| 5,390,125 A | 2/1995 | Sennott et al. |
| 5,491,636 A | 2/1996 | Robertson et al. |
| 5,735,718 A | 4/1998 | Ekwall |
| 5,736,962 A | 4/1998 | Tendler |
| 5,755,605 A | 5/1998 | Asberg |
| 5,884,213 A | 3/1999 | Carlson |
| 6,059,226 A | 5/2000 | Cotton et al. |
| 6,092,007 A | 7/2000 | Cotton et al. |
| 6,142,841 A | 11/2000 | Alexander, Jr. et al. |
| 6,230,642 B1 | 5/2001 | McKenney et al. |
| 6,234,853 B1 | 5/2001 | Lanyi et al. |
| 6,273,771 B1 | 8/2001 | Buckley et al. |
| 6,308,651 B2 | 10/2001 | McKenney et al. |
| 6,357,375 B1 | 3/2002 | Ellis |
| 6,377,889 B1 | 4/2002 | Soest |
| 6,386,930 B2 | 5/2002 | Moffet |
| 6,431,928 B1 | 9/2002 | Aarnivuo |
| 6,446,003 B1 | 9/2002 | Green et al. |
| 6,447,349 B1 | 9/2002 | Fadeley et al. |
| 6,485,341 B1 | 11/2002 | Lanyi et al. |
| 6,511,354 B1 | 1/2003 | Gonring et al. |
| 6,604,479 B2 | 8/2003 | McKenney et al. |
| 6,611,737 B1 | 8/2003 | El-Tahan et al. |
| 6,623,320 B1 | 9/2003 | Hedlund |
| 6,678,589 B2 | 1/2004 | Robertson et al. |
| 6,705,907 B1 | 3/2004 | Hedlund |
| 6,712,654 B1 | 3/2004 | Putaansuu |
| 6,848,382 B1 | 2/2005 | Bekker |
| 6,994,046 B2 | 2/2006 | Kaji et al. |
| 6,995,527 B2 | 2/2006 | Depasqua |
| 7,131,385 B1 | 11/2006 | Ehlers et al. |
| 7,140,315 B2 | 11/2006 | Okuyama |
| 7,220,153 B2 | 5/2007 | Okuyama |
| 7,261,605 B2 | 8/2007 | Misao et al. |
| 7,267,068 B2 | 9/2007 | Bradley et al. |
| 7,268,703 B1 | 9/2007 | Kabel et al. |
| 7,305,928 B2 | 12/2007 | Bradley et al. |
| 7,366,593 B2 | 4/2008 | Fujimoto et al. |
| 7,398,742 B1 | 7/2008 | Gonring |
| 7,416,458 B2 | 8/2008 | Suemori et al. |
| 7,429,202 B2 | 9/2008 | Yazaki et al. |
| 7,455,557 B2 | 11/2008 | Mizutani |
| 7,467,595 B1 | 12/2008 | Lanyi et al. |
| 7,476,134 B1 | 1/2009 | Fell et al. |
| 7,538,511 B2 | 5/2009 | Samek |
| 7,561,886 B1 | 7/2009 | Gonring et al. |
| 7,577,526 B2 | 8/2009 | Kim et al. |
| 7,630,798 B2 | 8/2009 | Mossman et al. |
| 7,727,036 B1 | 6/2010 | Poorman et al. |
| 7,883,383 B2 | 2/2011 | Larsson |
| 8,050,630 B1 | 11/2011 | Arbuckle |
| 8,082,100 B2 | 12/2011 | Grace et al. |
| 8,145,370 B2 | 3/2012 | Borrett |
| 8,145,371 B2 | 3/2012 | Rae et al. |
| 8,150,621 B1 | 4/2012 | Phillips et al. |
| 8,155,811 B2 | 4/2012 | Noffsinger et al. |
| 8,215,252 B1 | 7/2012 | Chun |
| 8,265,812 B2 | 9/2012 | Pease |
| 8,326,472 B2 | 12/2012 | Igarashi et al. |
| 8,417,399 B2 | 4/2013 | Arbuckle et al. |
| 8,439,800 B1 | 5/2013 | Bazan et al. |
| 8,478,464 B2 | 7/2013 | Arbuckle et al. |
| 8,480,445 B2 | 7/2013 | Morvillo |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,645,012 B2 | 2/2014 | Salmon et al. |
| 8,694,248 B1 | 4/2014 | Arbuckle et al. |
| 8,761,976 B2 | 6/2014 | Salmon et al. |
| 8,777,681 B1 | 7/2014 | McNalley et al. |
| 8,807,059 B1 | 8/2014 | Samples et al. |
| 8,808,041 B2 | 8/2014 | Hine et al. |
| 8,831,868 B2 | 9/2014 | Grace et al. |
| 8,924,054 B1 | 12/2014 | Arbuckle et al. |
| 9,039,468 B1 | 5/2015 | Arbuckle et al. |
| 9,110,467 B2 | 8/2015 | Yuet et al. |
| 9,132,900 B2 | 9/2015 | Salmon et al. |
| 9,132,903 B1 | 9/2015 | Gable et al. |
| 9,162,743 B2 | 10/2015 | Grace et al. |
| 9,248,898 B1 | 2/2016 | Kirchhoff et al. |
| 9,359,057 B1 | 6/2016 | Arbuckle et al. |
| 9,377,780 B1 | 6/2016 | Arbuckle et al. |
| 9,676,464 B2 | 6/2017 | Johnson et al. |
| 9,733,645 B1 | 8/2017 | Andrasko et al. |
| 9,904,293 B1 | 2/2018 | Heap et al. |
| 9,927,520 B1 | 3/2018 | Ward et al. |
| 9,952,595 B2 | 4/2018 | Arbuckle et al. |
| 10,095,232 B1 | 10/2018 | Arbuckle et al. |
| 2003/0191562 A1 | 10/2003 | Robertson et al. |
| 2004/0221787 A1 | 11/2004 | McKenney et al. |
| 2005/0092225 A1* | 5/2005 | Kaji ................ B63H 25/04 114/144 R |
| 2005/0164569 A1 | 7/2005 | Kaji et al. |
| 2005/0170713 A1 | 8/2005 | Okuyama |
| 2006/0089794 A1 | 4/2006 | Depasqua |
| 2006/0116796 A1 | 6/2006 | Fossen et al. |
| 2007/0017426 A1 | 1/2007 | Kaji et al. |
| 2007/0032923 A1 | 2/2007 | Mossman et al. |
| 2007/0089660 A1 | 4/2007 | Bradley et al. |
| 2007/0162207 A1 | 7/2007 | Shimo et al. |
| 2007/0178779 A1 | 8/2007 | Takada et al. |
| 2007/0203623 A1 | 8/2007 | Saunders et al. |
| 2007/0089654 A1 | 9/2007 | Bradley et al. |
| 2007/0233389 A1 | 10/2007 | Stephens |
| 2008/0027597 A1 | 1/2008 | Barrett et al. |
| 2009/0037040 A1 | 2/2009 | Salmon et al. |
| 2009/0076671 A1* | 3/2009 | Mizutani ............ B63H 21/22 701/21 |
| 2009/0171520 A1 | 7/2009 | Kaji |
| 2009/0276148 A1 | 11/2009 | Ardvisson |
| 2010/0023192 A1 | 1/2010 | Rae et al. |
| 2010/0070124 A1 | 3/2010 | Yeager et al. |
| 2010/0109944 A1 | 5/2010 | Whitehead et al. |
| 2010/0138083 A1 | 6/2010 | Kaji |
| 2010/0145558 A1 | 6/2010 | Kaji |
| 2011/0153126 A1 | 6/2011 | Arbuckle et al. |
| 2011/0166724 A1 | 7/2011 | Hiramatsu |
| 2011/0288714 A1 | 11/2011 | Flohr et al. |
| 2012/0129410 A1 | 5/2012 | Tyers |
| 2012/0130570 A1 | 5/2012 | Pease |
| 2012/0248259 A1 | 10/2012 | Page et al. |
| 2013/0080044 A1 | 3/2013 | Tyers et al. |
| 2013/0297104 A1 | 11/2013 | Tyers et al. |
| 2014/0114509 A1 | 4/2014 | Venables et al. |
| 2014/0362661 A1 | 12/2014 | Muijzert et al. |
| 2015/0089427 A1 | 3/2015 | Akuzawa |
| 2015/0277442 A1 | 10/2015 | Ballou |
| 2015/0321740 A1 | 11/2015 | Bradley et al. |
| 2015/0346730 A1 | 12/2015 | Stephens et al. |
| 2016/0016651 A1 | 1/2016 | Anderson et al. |
| 2016/0039500 A1 | 2/2016 | Heyring et al. |

(56) References Cited

U.S. PATENT DOCUMENTS

| | | | |
|---|---|---|---|
| 2016/0061980 A1 | 3/2016 | Tonchia et al. |
| 2016/0101838 A1 | 4/2016 | Kojima |
| 2016/0125739 A1 | 5/2016 | Stewart et al. |
| 2016/0246300 A1 | 8/2016 | Langford-Wood |
| 2016/0252907 A1 | 9/2016 | Parkinson |
| 2016/0299507 A1 | 10/2016 | Shah et al. |
| 2016/0334792 A1* | 11/2016 | Jopling | G05D 1/0206 |
| 2017/0205828 A1 | 7/2017 | Estabrook |
| 2017/0205829 A1 | 7/2017 | Tyers |
| 2017/0210449 A1 | 7/2017 | Frisbie et al. |
| 2017/0253314 A1 | 9/2017 | Ward |
| 2017/0255200 A1 | 9/2017 | Arbuckle et al. |
| 2017/0255201 A1 | 9/2017 | Arbuckle et al. |
| 2017/0277189 A1 | 9/2017 | Johnson et al. |
| 2017/0349257 A1 | 12/2017 | Hara et al. |
| 2017/0365175 A1 | 12/2017 | Harnett |
| 2018/0015994 A1 | 1/2018 | Kishimoto et al. |
| 2018/0106619 A1 | 4/2018 | Johnson et al. |
| 2018/0231980 A1 | 8/2018 | Arbuckle et al. |
| 2018/0284815 A1 | 10/2018 | Cui et al. |
| 2019/0286169 A1 | 9/2019 | Cui et al. |
| 2019/0359300 A1 | 11/2019 | Johnson et al. |

FOREIGN PATENT DOCUMENTS

| | | |
|---|---|---|
| EP | 816962 | 7/1998 |
| EP | 2161542 | 3/2010 |
| EP | 2952994 | 12/2015 |
| GB | 1173442 | 12/1969 |
| JP | 58061097 | 4/1983 |
| JP | 05-203638 | 8/1993 |
| JP | 7223591 | 8/1995 |
| JP | 2926533 | 7/1997 |
| JP | 11-129978 | 5/1999 |
| JP | 2001-287697 | 10/2001 |
| JP | 2002-178990 | 6/2002 |
| JP | 2002173091 | 6/2002 |
| JP | 2003276677 | 10/2003 |
| JP | 200442884 | 2/2004 |
| JP | 2004355105 | 12/2004 |
| JP | 200546034 | 2/2005 |
| JP | 2005-200004 | 7/2005 |
| JP | 2006-137309 | 6/2006 |
| JP | 2006137309 | 6/2006 |
| JP | 2009-227035 | 10/2009 |
| JP | 2009-241738 | 10/2009 |
| JP | 2009-538782 | 11/2009 |
| JP | 2011128943 | 6/2011 |
| JP | 5042906 | 7/2012 |
| JP | 2012528417 | 11/2012 |
| JP | 5226355 | 7/2013 |
| JP | 2014065495 | 4/2014 |
| WO | WO 9205505 | 4/1992 |
| WO | WO 2006058400 | 6/2006 |
| WO | WO 2014033457 | 3/2014 |
| WO | WO 2016104031 | 6/2016 |
| WO | WO 2017095235 A1 | 6/2017 |
| WO | WO 2017095235 A1 | 8/2017 |

OTHER PUBLICATIONS

Ward et al., "Method and System for Close Proximity Collision Detection," Unpublished U.S. Appl. No. 14/807,217, filed Jul. 23, 2015.

Poorman et al., "Multilayer Control System and Method for Controlling Movement of a Marine Vessel," Unpublished U.S. Appl. No. 11/965,583, filed Dec. 27, 2007.

Mercury Marine, Axius Generation 2 Installation Manual, Jul. 2010, pp. 22-25.

Mercury Marine, Joystick Piloting for Outboards Operation Manual, 2013, pp. 24-26.

Mercury Marine, Zeus 3000 Series Pod Drive Models Operation Manual, 2013, pp. 49-52.

Arbuckle et al., "System and Method for Controlling a Position of a Marine Vessel Near an Object," Unpublished U.S. Appl. No. 15/818,226, filed Nov. 20, 2017.

Arbuckle et al., "System and Method for Controlling a Position of a Marine Vessel Near an Object," Unpublished U.S. Appl. No. 15/818,233, filed Nov. 20, 2017.

Arbuckle et al., "Station Keeping Methods," Unpublished U.S. Appl. No. 15/445,031, filed Feb. 28, 2017.

Arbuckle et al., "Station Keeping Methods," Unpublished U.S. Appl. No. 15/887,372, filed Feb. 2, 2018.

Gonring, "System and Method for Controlling Course of a Marine Vessel," Unpublished U.S. Appl. No. 15/415,095, filed Jan. 25, 2017.

* cited by examiner

METHODS FOR POSITIONING MARINE VESSELS

FIELD

The present disclosure relates to automatic positioning systems and methods for marine vessels.

BACKGROUND

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464 discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

U.S. Pat. No. 8,807,059 discloses systems for maneuvering a marine vessel comprising an input device for requesting lateral movement of the marine vessel with respect to the longitudinal axis and a plurality of propulsion devices including at least a port propulsion device, a starboard propulsion device and an intermediate propulsion device disposed between the port and starboard propulsion devices. A control circuit controls orientation of the port and starboard propulsion devices inwardly towards a common point on the marine vessel, and upon a request for lateral movement of from the input device, operates one of the port and starboard propulsion devices in forward gear, operates the other of the port and starboard propulsion devices in reverse gear, and operates the intermediate propulsion device in reverse gear.

Unpublished U.S. patent application Ser. No. 15/425,184, filed Feb. 6, 2017, discloses a method for maintaining a marine vessel propelled by a marine propulsion device in a selected position, including determining a current global position of the marine vessel and receiving a signal command to maintain the current global position. The current global position is stored as a target global position in response to receiving the signal command. A subsequent global position of the marine vessel is determined and a position error difference between the subsequent global position and the target global position is determined. The method includes determining marine vessel movements required to minimize the position error difference, and causing the marine propulsion device to produce a thrust having a magnitude, a direction, and an angle calculated to result in achievement of the required marine vessel movements. At least one of timing and frequency of discontinuity of thrust production is controlled while the position error difference is minimized.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2017/0255201 discloses a method for controlling movement of a marine vessel, including controlling a propulsion device to automatically maneuver the vessel along a track including a series of waypoints, and determining whether the next waypoint is a stopover waypoint at or near which the vessel is to electronically anchor. If the next waypoint is the stopover waypoint, a control module calculates a distance between the vessel and the stopover waypoint. In response to the calculated distance being less than or equal to a threshold distance, the propulsion device's thrust is decreased. In response to sensing that the vessel thereafter slows to a first threshold speed, the vessel's speed is further reduced. In response to sensing that the vessel thereafter slows to a second, lower threshold speed or passes the stopover waypoint, the propulsion device is controlled to maintain the vessel at an anchor point that is at or near the stopover waypoint.

U.S. Pat. No. 10,324,468 discloses a method and system for controlling a position of a marine vessel near an object. A location sensor determines a location of the marine vessel, and a speed sensor determines a speed of the marine vessel. A control module is in signal communication with the location sensor and the speed sensor. A marine propulsion system is in signal communication with the control module. The control module determines if the marine vessel is within a predetermined range of the object based on the marine vessel's location. In response to determining that the marine vessel is within the predetermined range of the object, the control module controls the propulsion system to produce at least one of a braking linear thrust and a braking moment to counter current movement of the marine vessel.

U.S. Pat. No. 10,429,845 discloses a marine vessel powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

Other patents describing various station keeping features and related system and method improvements include: U.S. Pat. Nos. 7,267,068; 8,050,630; 8,417,399; 8,694,248; 8,924,054; 9,132,903; 9,377,780; 9,733,645; and 9,927,520.

Each of the above-noted patents and patent publications is hereby incorporated by reference herein.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example of the present disclosure, a method for positioning a marine vessel powered by a marine propulsion system including a plurality of marine propulsion devices is disclosed. The method is carried out by a control module in communication with the marine propulsion system and includes receiving a measured actual position of the vessel and determining a first error between the actual position of the vessel and a desired target position of the vessel. In response to the first error being in a fore/aft direction of the vessel, the method includes commanding a first subset of marine propulsion devices in the plurality of marine propulsion devices to produce thrust to minimize the first error in the fore/aft direction, as appropriate, while a remainder of the marine propulsion devices in the plurality of marine propulsion devices do not produce thrust. The method thereafter includes commanding the first subset of marine propulsion devices to cease producing thrust.

Another method for positioning a marine vessel powered by a marine propulsion system including a plurality of marine propulsion devices is also disclosed. The method is carried out by a control module in communication with the marine propulsion system and includes receiving a measured actual position of the vessel and determining a first error between the actual position of the vessel and a desired target position of the vessel. The method includes selecting whether to actuate all marine propulsion devices in the plurality of marine propulsion devices or a first subset of marine propulsion devices in the plurality of marine propulsion devices based on a magnitude and a direction of the first error. The method then includes commanding all of or the first subset of marine propulsion devices in the plurality of marine propulsion devices to produce thrust to minimize the first error, based on the determination in the previous step. When the first subset of marine propulsion devices produces thrust to minimize the first error, a remainder of the marine propulsion devices in the plurality of marine propulsion devices does not produce thrust.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

Figure 1:
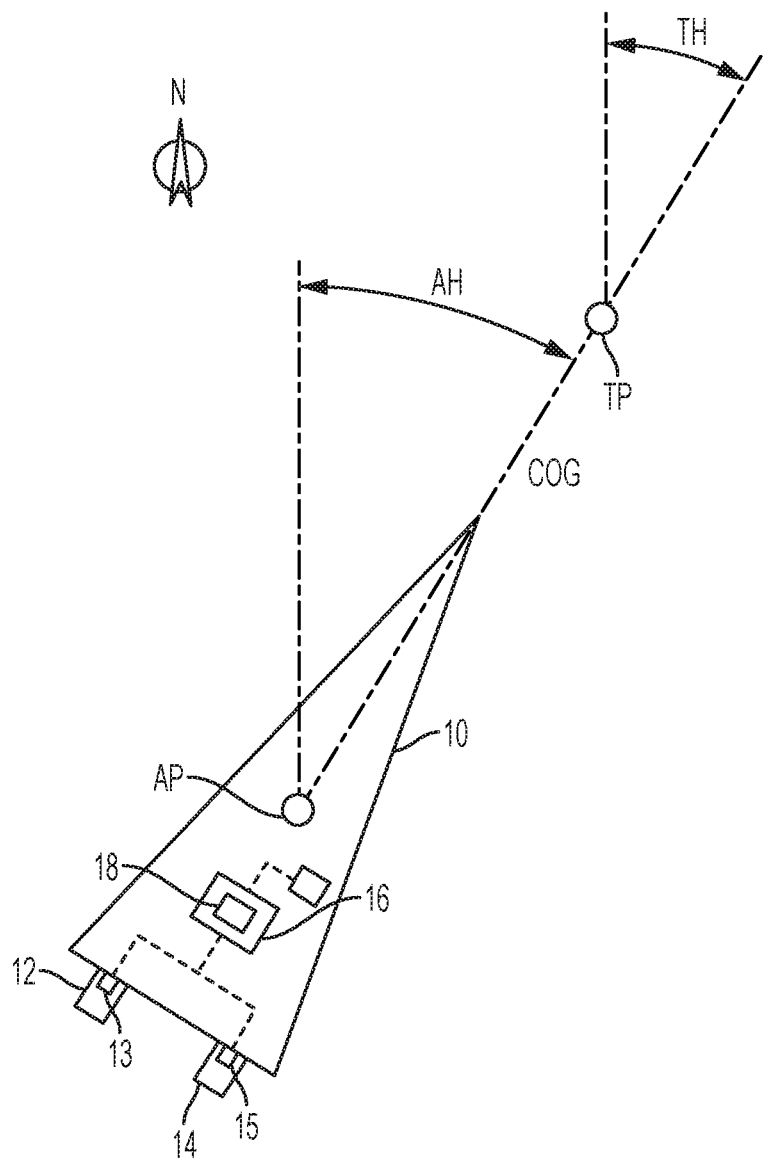
FIG. 1 is a schematic for purposes of illustrating a method for positioning a marine vessel at a target global position and a target heading.

Referring to FIG. 1, a marine vessel 10 can be directed to a predetermined target global position TP (defined by latitude and longitude) and oriented at a predetermined target heading TH by way of an algorithm that automatically controls the vessel's marine propulsion devices 12, 14. A control module 16 that controls thrust and angular orientation of the propulsion devices 12, 14 acts as a joystick and calculates left/right, fore/aft, and yaw commands required to drive the vessel's position error (difference between an actual position AP and the target position TP) and heading error (difference between an actual heading AH and the target heading TH) to zero. The propulsion devices 12, 14 may be located at the rear of the vessel 10 such as with outboards, jet drives, or stern drives, under the vessel 10 such as with pod drives, or at the front of the vessel 10 such as with thrusters, which may also or alternatively be located at the rear or sides of the vessel 10. Each propulsion device 12, 14 is associated with a respective power transmission mechanism 13, 15. The power transmission mechanisms 13, 15 may each comprise a single shaft, gear, or clutch, or may comprise a series of shafts, gears, clutches, etc. that transmit power from a prime mover, such as an engine or a motor located in the propulsion device 12 or 14 or aboard the vessel 10, to a rotating thrust-producing device, such as a propeller, impeller, propulsor, or the like. The power transmission mechanisms 13, 15 may be transmissions that are shiftable to forward, neutral, and reverse positions, or may be designed such that they are capable only of rotating or not rotating, for example if they are engaged or not engaged with the prime mover or if the prime mover itself is turned on or off.

According to programming of the control module 16, the vessel 10 can be operated in a waypoint tracking mode, in which the vessel 10 is propelled from one waypoint (geographical coordinate) to another at a heading calculated to reach the target waypoint. The target waypoint can be one waypoint in a series of waypoints, upon arrival at which the vessel 10 is to take one of several actions. In one example, upon arriving at the target waypoint, the vessel 10 continues on to the next waypoint in the track with little or no pause. In another example, the vessel 10 pauses at the target waypoint for a predetermined period of time before continuing on to the next waypoint in the track. In yet another example, the target waypoint is the final waypoint in a track, at which the vessel 10 is to maintain position and/or heading indefinitely, until further input from the operator is received. Such a final waypoint may be near a dock, seawall, or other object at which the vessel 10 is to be moored for a period of time, such as if an auto-docking algorithm is initiated. On example of a waypoint tracking algorithm is described in the above-incorporated U.S. Patent Application Publication No. 2017/0255201, and will therefore not be described in further detail herein.

In another example, the control module 16 is programmed to carry out a station keeping mode that maintains the target position TP and the target heading TH of the vessel 10 despite the presence of wind, waves, and other external forces tending to move the vessel 10 from these targets. In essence, the propulsion devices 12, 14 are controlled to maintain the vessel 10 at a virtual anchor point. This virtual anchor point may be in the middle of a body of water or, if an auto-docking algorithm is initiated, may be near a dock, seawall, or other object at which the vessel 10 is to be moored for a period of time. One example of a station keeping algorithm is described in the above-incorporated U.S. Pat. No. 7,305,928, and will therefore not be described in further detail herein.

An example of the inputs to the control module's calculations while the vessel 10 in the waypoint tracking or station keeping mode is shown in FIG. 1. In this example, the actual position (AP) of a preselected point on the vessel 10 is not equal to a desired target position (TP), and thus the control module 16 will calculate a course over ground (COG) that the vessel 10 must travel to reach the target position TP. A setpoint target heading (TH) is 27 degrees from north, and the actual heading of the vessel 10 (AH) is also 27 degrees from north. Therefore, the control module 16 will determine that no heading correction is needed. The actual positon AP can be determined by a position determination device such as a GPS receiver or proximity sensor, as described in U.S. Patent Application Publication No. 2017/0253314, which was incorporated by reference herein above. The heading can be read from a compass or an inertial measurement unit (IMU) or can be determined using proximity sensors, as is also described in U.S. Patent Application Publication No. 2017/0253314. Note that although in this example the actual heading AH is equal to the target heading TH, in another example, the headings may not be equal to one another. In such a case, the control module 16 would determine that a yaw movement (clockwise or counterclockwise rotation) of a calculated number of degrees is required to orient the vessel 10 at the target heading TH.

The control module 16 determines when and how much corrective action to take according to a three-dimensional (left/right, fore/aft, and yaw) proportional, integral, and derivative (PID) control algorithm performed by a feedback controller 18 of the control module 16. The integral term allows the control module 16 to reject constant and slowly varying disturbances (e.g., water current) while maintaining near zero position error. The proportional and derivative terms handle the quickly varying disturbances. The integral term is also considered to have memory and can take time to increase or decrease, especially if the disturbance forces grow. The PID feedback controller 18 computes a desired force in the forward/back and left/right directions with reference to the vessel 10, along with a desired yaw moment relative to the vessel 10, in order to null the error elements. The computed force and moment elements are then transmitted to the vessel maneuvering system, which delivers the requested forces and moments by positioning the independently steerable propulsion devices 12, 14, controlling the power provided to the propellers, impellers, or propulsors of each device, and controlling the thrust vector directions of both devices. Such automatic correction of the position and heading of the vessel 10 can be achieved according to the principles described in U.S. Pat. No. 7,305,928, which was incorporated by reference herein above.

Figure 2:
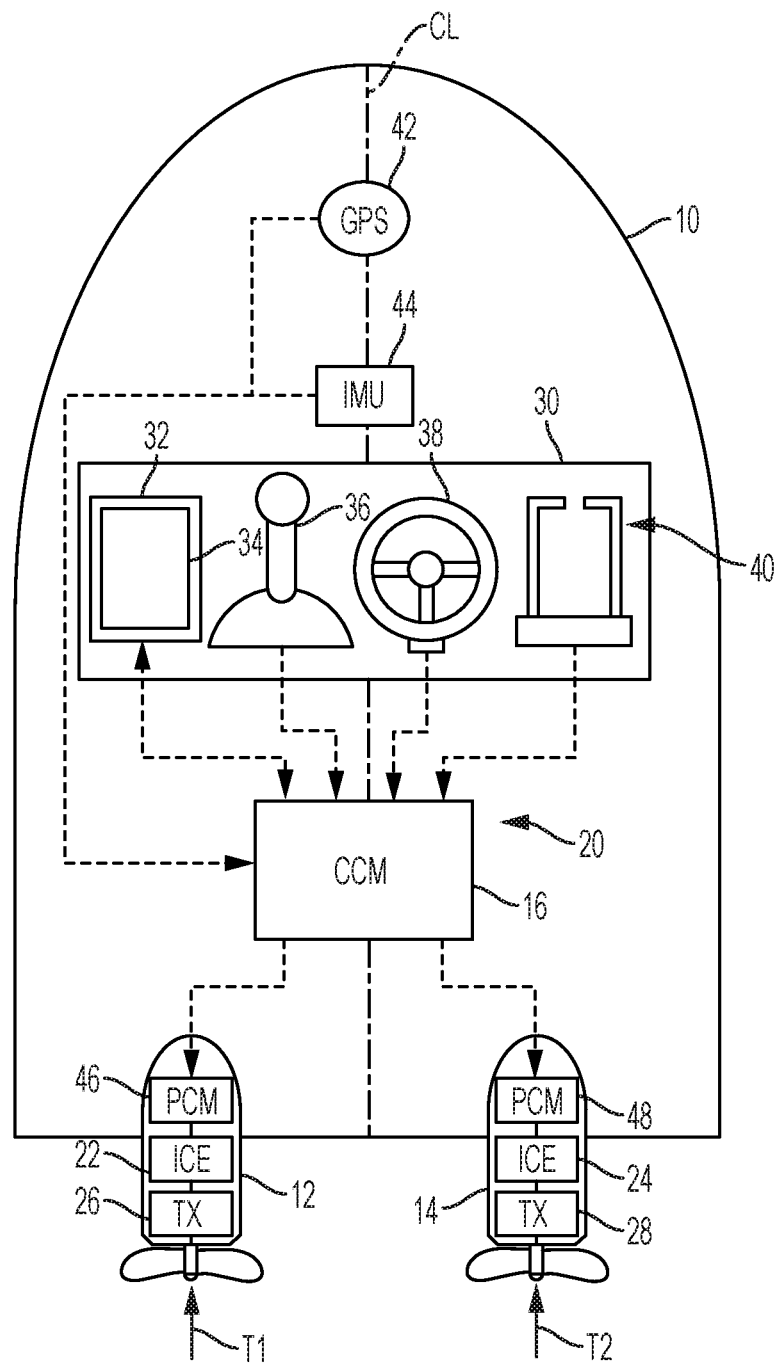
FIG. 2 is a schematic of a marine vessel with a marine propulsion system.

A more detailed schematic of the vessel 10 is provided in FIG. 2. The vessel 10 includes a marine propulsion system 20 including a plurality of marine propulsion devices 12, 14. Note that three, four, or more propulsion devices could in fact be provided, as will be described more fully herein below. The control module 16 (here, called a command control module, CCM) controls the magnitudes of thrusts T1, T2 of the propulsion devices 12, 14, such as by controlling speed of their internal combustion engines 22, 24. The control module 16 also controls shift positions of the propulsion devices 12, 14 between forward, neutral, and reverse by way of transmissions 26, 28. The control module 16 additionally controls the steering angles of the propulsion devices 12, 14, which affect the angles of their thrusts T1, T2 with respect to an imaginary centerline CL of the vessel 10 running from bow to stem.

A command console 30 of the marine propulsion system 20 includes an electronic navigation device 32 having an operator interface 34. The electronic navigation device 32 can facilitate the waypoint tracking, station keeping, and or auto-docking modes, such as by providing to the control module 16 a desired track including a series of waypoints and/or a graphic depiction of an area where the vessel 10 is to be electronically anchored and/or moored. For example, the electronic navigation device 32 can be a chart plotter. A joystick 36 and a steering wheel 38 are also provided at the command console 30, and can provide steering commands to the propulsion devices 12, 14 via the control module 16, as is known. A pair of throttle/shift levers 40 is also provided, and the levers 40 are moveable between forward, neutral, and reverse positions, which signal the control module 16 to command corresponding shift positions of the transmissions 26, 28 and various speeds of the engines 22, 24, as is also known.

The marine propulsion system 20 also includes a position determination device 42, such as a GPS receiver, that provides to the control module 16 a current, actual geographic position of the vessel 10 in latitude and longitude. The position determination device 42 can also determine the speed of the vessel 10 over water by determining how far the vessel 10 travels, as determined from GPS position, over a given period of time. A heading detector 44, such as an inertial measurement unit (IMU), may also be provided in signal communication with the control module 16. The heading detector 44 detects an actual heading of the vessel 10. In other examples, the heading detector is a compass. In still other examples, the position determination device 42 and heading detector 44 are part of a single device, such as an attitude and heading reference system. In still other examples, as noted herein above, the position and heading of the vessel 10 are determined using proximity sensors (not shown) when the vessel 10 is within range of an object of interest, such as a dock, seawall, etc.

Still referring to FIG. 2, the control module 16 is programmable and includes a processing system and a storage system. The control module 16 can be located anywhere on the vessel 10 and/or located remote from the vessel 10 and can communicate with various components of the vessel 10 via a peripheral interface and wired and/or wireless links. Portions of the method disclosed herein below can be carried out by a single control module or by several separate control modules. Although FIG. 1 shows one control module 16, the vessel 10 can include more than one control module, as in FIG. 2. For example, the system can have a control module located at or near a helm of the vessel 10 and can also have control module(s), such as propulsion control modules 46, 48, located at or near the propulsion devices 12, 14. If more than one control module is provided, each can control operation of a specific device or sub-system on the vessel 10.

In some examples, the control module 16 may include a computing system that includes a processing system, storage system, software, and input/output (I/O) interface for communicating with peripheral devices. The systems may be implemented in hardware and/or software that carries out a programmed set of instructions. For example, the processing system loads and executes software from the storage system, such as software programmed with a waypoint tracking, station keeping, and/or auto-docking method, which directs the processing system to operate as described herein above. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 16 communicates with one or more of the components on the vessel 10 via the I/O interface and a communication link, which can be a wired or wireless link. In one example, the communication link is a controller area network (CAN) bus, but other types of links could be used. The I/O interface allows the control module 16 to interact with both input devices, such as the position determination device 42, the heading detector 44, the electronic navigation device 32, the joystick 36, the steering wheel 38, and the throttle/shift levers 40, as well as with output devices such as the electronic navigation device 32 and the propulsion devices 12, 14. Other types of input devices can be provided in signal communication with the control module 16, such as keyboards, remote controls, voice command receivers, touch screens, keypads, buttons, etc., any of which may be part of the operator interface 34 on the electronic navigation device 32. In the example in which the electronic navigation device 32 is a chart plotter, the operator interface 34 may include a touch screen, display-only screen, and/or a keypad or buttons that allow the operator to select a track or destination docking position by scrolling through a menu or selecting it from the touch screen.

FIG. 2 illustrates a thrust orientation that is used when it is desired to move the vessel 10 in a forward direction, with no movement in either a right or left direction and no rotation. This is done by rotating the first and second propulsion devices 12, 14 into an aligned position, in which their thrust vectors T1 and T2 are parallel to one another, and placing the transmissions 26, 28 of the propulsion devices 12, 14 into forward gear. As can be seen in FIG. 2, the first and second thrust vectors, T1 and T2, are equal in magnitude and are directed in the same forward direction. This creates no resultant rotation about the vessel's center of gravity and no resultant movement in either the left or right directions. Movement in the forward direction results from all of the vector components of the first and second thrust vectors T1, T2 being resolved in a forward direction parallel to the centerline CL of the vessel 10. It should be understood that engagement of the transmissions 26, 28 of the propulsion devices 12, 14 in the reverse gear while the propulsion devices 12, 14 are aligned parallel to the centerline CL will result in movement in a reverse direction of the vessel 10.

The present disclosure contemplates a number of ways in which the above-described waypoint tracking, station keeping, and auto-docking functionalities can modified to prevent or at least reduce the likelihood of overshoot of the target position TP. A need for this type of modification arose with the advent of the application of waypoint tracking and station keeping methods to vessels equipped with stern drives or outboard motors. When station keeping is implemented on a vessel propelled by a pod drive, a trolling valve can be used to allow slip between the engine and the propeller of the pod drive. Such slip allows for very small increments of thrust, thereby enabling the vessel 10 to be moved by very small distances upon engagement of the transmission. However, stern drives are not generally equipped with trolling valves, and thus the thrust increment from neutral to in-gear is larger. With an outboard, the thrust increment is even more pronounced, especially if the outboard has dual propellers or a high pitch propeller. For instance, if a vessel propelled by outboard motors is put into gear for even one second, the vessel may travel fifteen feet before naturally coming to rest. Thus, if the vessel was fewer than fifteen feet from the target position TP, putting the propulsion devices in gear would result in overshooting the target. With the advent of automatic docking systems, such overshoot could result in damage to the vessel 10 or the object near which it is being maneuvered; therefore, the present inventors have realized the benefit of reducing overshoot whenever possible.

Figure 3:
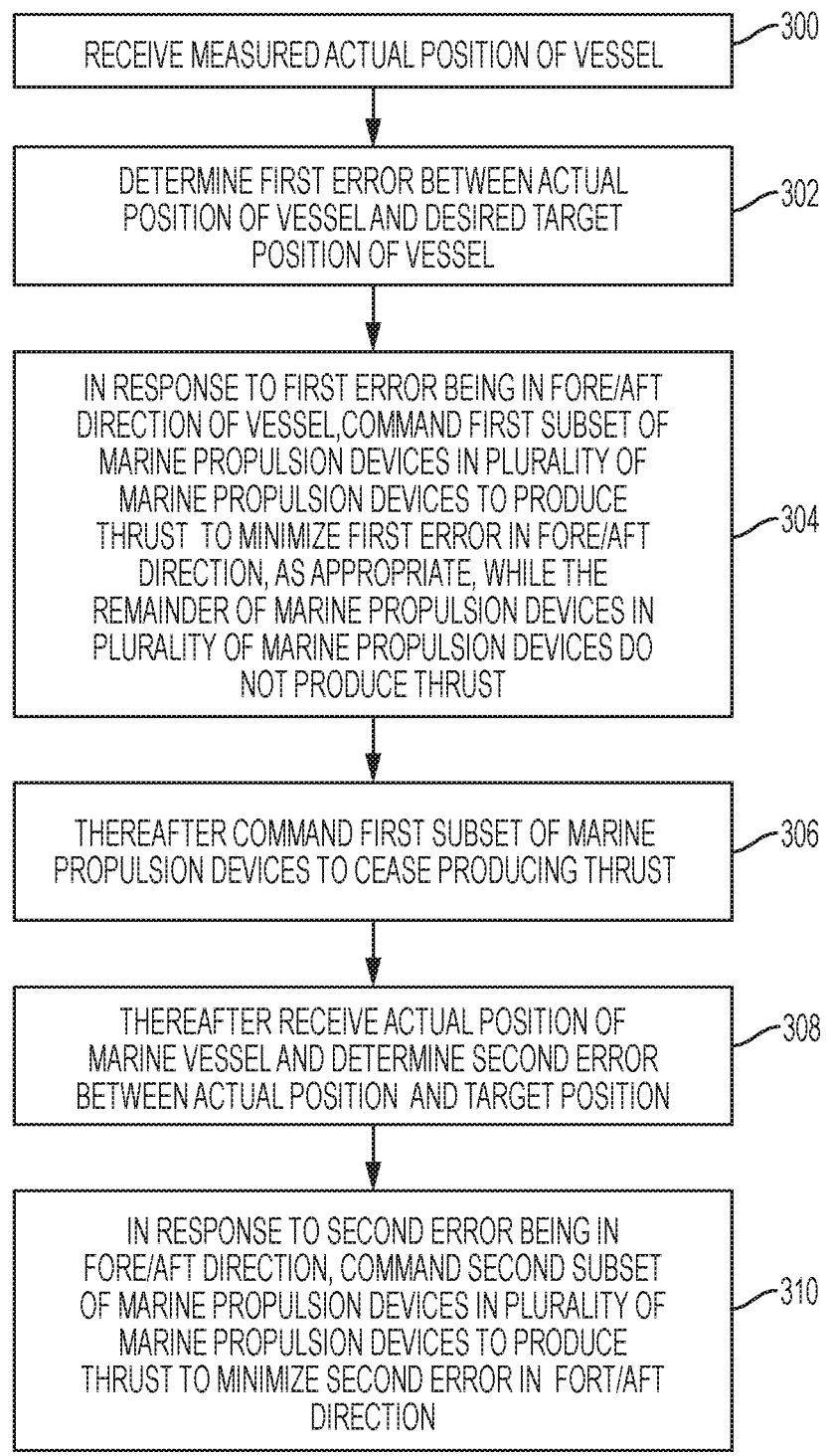
FIG. 3 illustrates one example of a method for positioning a marine vessel according to the present disclosure.

The method according to the present disclosure is for positioning a marine vessel 10 powered by a marine propulsion system 20 including a plurality of marine propulsion devices 12, 14. The method is carried out by a control module 16 in communication with the marine propulsion system 20. As shown in FIG. 3, the method includes receiving a measured actual position AP of the vessel 10 (see 300). As shown at 302, the method also includes determining a first error between the actual position AP of the vessel 10 and a desired target position TP of the vessel 10. Before the method proceeds, the control module 16 may compare the first error to a predetermined value, which represents an estimate of the smallest increment of movement the vessel 10 is able to accomplish. If the first error is less than this value, then it is likely that any attempt at correction will result in overshooting the target position TP, and the method returns to 300. If the first error has a value that is correctable, as shown at 304, in response to the first error being in a fore/aft direction of the vessel, the method includes commanding a first subset of marine propulsion devices in the plurality of marine propulsion devices to produce thrust to minimize the first error in the fore/aft direction, as appropriate, while maintaining a remainder of the marine propulsion devices in the plurality of marine propulsion devices in neutral. As shown at 306, the method includes thereafter commanding the first subset of marine propulsion devices to cease producing thrust. By having only a subset of the marine propulsion devices producing thrust to propel the vessel 10, the vessel 10 is propelled with less total thrust than it would otherwise be were all propulsion devices 12, 14 producing thrust to minimize the error, as in the example of FIG. 2. Using less thrust to correct the error results in less chance of overshooting the target position TP.

Generally, vessels are designed to move in the fore/aft direction; thus, even a small amount of thrust, such as that from only one propulsion device 12 or 14, could be enough to keep the vessel 10 moving through the water for some time after the thrust has ceased. Therefore, it may be desirable to use the present method of commanding the first subset of marine propulsion devices to produce thrust when only fore/aft error is present, as noted in box 304.

Figure 4:
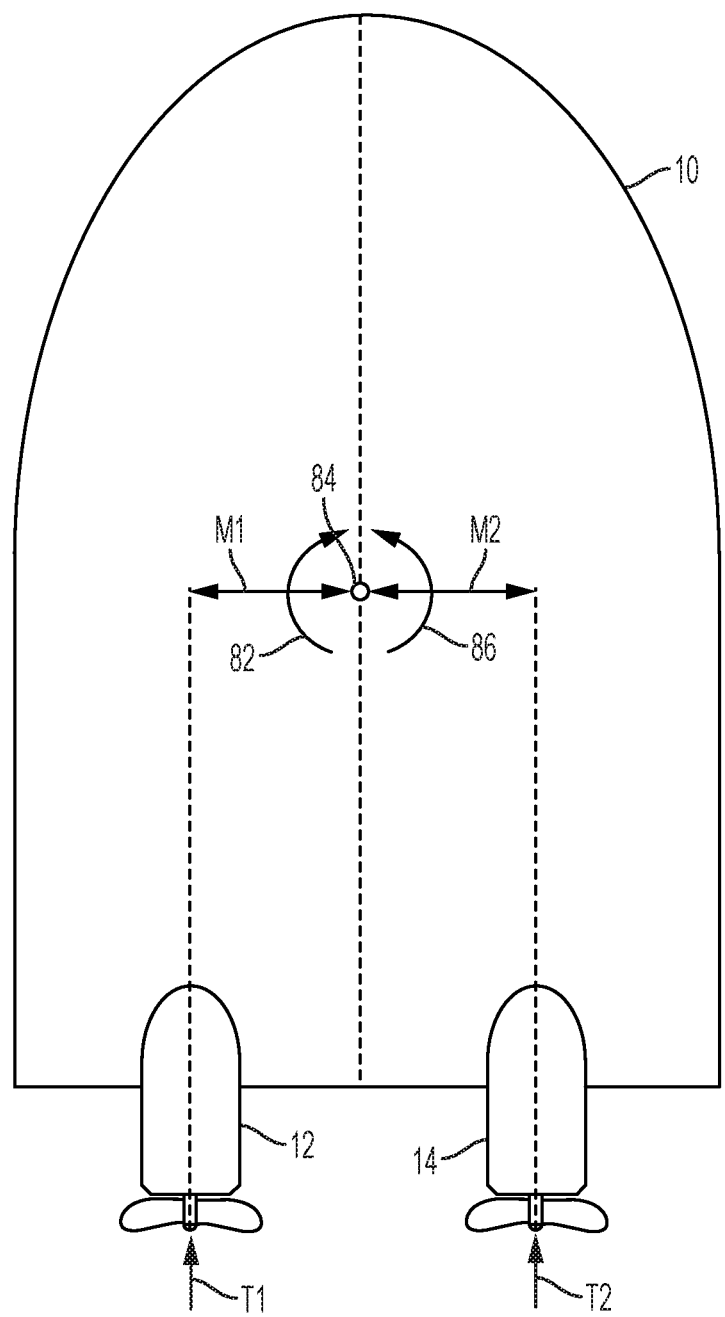
FIG. 4 is a schematic showing yaw moments induced on the marine vessel.

Turning to FIG. 4, in this example, the plurality of marine propulsion devices comprises two propulsion devices 12, 14, the first subset comprises one of the two marine propulsion devices (e.g., the propulsion device 12), and the second subset comprises the other of the two marine propulsion devices (e.g., the propulsion device 14). Note that a moment (represented by arrow 82) will be imposed on the vessel 10 to cause it to rotate about its center of gravity 84 when only the propulsion device 12 produces thrust. This is because effective moment arm M1 exists with respect to the first thrust vector T1 and the center of gravity 84, and therefore, a moment is exerted on the vessel 10 as represented by arrow 82. As a result, the vessel 10 in FIG. 4 will rotate in a clockwise direction in response to the moment 82 as the vessel 10 moves in the forward direction. Thus, the present inventors have developed the present algorithm such that this resulting rotation is corrected for during the next iteration of control.

Returning to FIG. 3, as shown at 308, the method includes thereafter receiving the actual position of the vessel 10 and determining a second error between the actual position and the target position. In response to the second error being in the fore/aft direction, as shown at 310, the method includes commanding a second subset of marine propulsion devices in the plurality of marine propulsion devices to produce thrust to minimize the second error in the fore/aft direction. Continuing with the example of FIG. 4, the second subset of marine propulsion devices would be the propulsion device 14. Actuating only the propulsion device 14 to produce the thrust T2 will impose a moment represented by arrow 86 on the vessel 10, according to the moment arm M2. If the magnitude of thrust T2 is the same as that of T, which was produced during the earlier iteration of control, any rotation of the vessel 10 in the counterclockwise direction due to the moment 86 should correct for any previous rotation of the vessel 10 due to the moment 82. This is because the moment arms M1 and M2 are presumed to be the same, as the propulsion devices 12, 14 are mounted on the vessel's transom symmetrically with respect to the vessel's centerline CL. Thus, any rotation induced during the first iteration of control, tending to change the heading of the vessel 10, is counteracted by any subsequent rotation in the opposite direction during the second iteration of control. Note that although the first subset of propulsion devices is here described as the propulsion deice 12, and the second subset as the propulsion device 14, the first subset could instead be the propulsion device 14, and the second subset the propulsion device 12.

The method may thereafter include alternating between commanding the first and second subsets of the plurality of marine propulsion devices to produce thrust to minimize any remaining error between the actual position AP and the target position TP. In this way, any induced rotation in one direction during an earlier iteration of control is corrected for during a later iteration of control, while each control iteration still produces less total thrust in the forward direction than if both propulsion devices 12, 14 produced thrust at the same time. In another example, instead of alternating actuation of the propulsion devices 12, 14 once in a row, the control module 16 may actuate the first subset of marine propulsion devices two or more times in a row and then actuate the second subset the same number of times in a row in order to correct the position error and any induced yaw.

The method may also include commanding the first subset of marine propulsion devices to produce thrust for a predetermined period of time before commanding the first subset of marine propulsion devices to cease producing thrust. The period of time is calibratable and can be determined from an input-output map, such as a lookup table, given the input(s) of a last reading of vessel velocity and/or a measured/sensed distance between the vessel 10 and an object of interest. For example, the input-output map may return a shorter period of time for faster vessel speeds and a longer period of time for slower vessel speeds, in order to take momentum into account. In another example, the period of time is a fixed value, and is on the order of 0.5 to 5 seconds. The period of time may be calibrated to overcome the static friction between the vessel and the water, and thus may depend on vessel hull type and dimensions. In yet another example, the period of time is calculated based on the error between the actual position AP of the vessel 10 and the target position TP of the vessel 10, wherein generally the period of time will be longer the greater the error.

The method may also include commanding throttle valves of the engines of the first subset of marine propulsion devices to open to idle positions while commanding the first subset of marine propulsion devices to shift into forward or reverse gear to produce thrust. For example, when the first subset comprises the propulsion device 12, the control module 16 would command the throttle valve of the engine 22 to open to an idle position. Generally, the magnitude of thrust generated by placing the throttle valve in an idle position and the transmission 26 in forward or reverse gear will be enough to overcome the above-noted static friction in the water and propel the vessel 10 forward or backward, respectively. However, in other examples, the throttle valve could be opened to a position that is greater than the idle position. This position could be a predetermined calibrated position that is the same every time, or could be calculated or determined based on external conditions acting on the vessel 10 or the error between the actual position AP and the target position TP. Generally, in the latter examples, the throttle valve would be opened more for rough external conditions acting against the desired direction of the vessel 10 and less for calm external conditions acting against the desired direction of the vessel 10. The throttle would be opened more for a larger position error and less for a smaller position error.

The control module 16 might also use the magnitude of the error between the actual position AP and the target position TP and the external conditions acting on the vessel 10 to determine if all or only some of the marine propulsion devices on the vessel 10 should be actuated. For example, the method may include comparing the first (or second) error between the actual position AP and the target position TP to an error threshold. The control module 16 may command all the propulsion devices (i.e., both 12 and 14) in the plurality of marine propulsion devices to produce thrust in response to the first (or second) error being greater than the error threshold. On the other hand, the control module may command only the first (or second) subset of propulsion devices (i.e., only 12 or 14) in the plurality of marine propulsion devices to produce thrust in response to the first (or second) error being less than the error threshold. In this way, the smaller thrust produced by actuating only a subset of the marine propulsion devices is only relied upon for position correction once the vessel 10 is very close (i.e., within a threshold distance) of the target position TP, where fine control is desirable. Outside of this threshold, it is more efficient to use more marine propulsion devices to correct position error, as the vessel 10 still has some ways to go before it reaches the target position TP. The control module 16 may switch between actuating all marine propulsion devices and only subsets of the marine propulsion devices as the vessel 10 moves back or forth across the above-noted threshold.

Similarly, the method may include determining a state of external conditions acting on the vessel 10. This may be done by sensing wind or current with appropriate sensors in signal communication with the control module 16. This might also be done by predicting that conditions are calm if the position error stays small for a long period of time, or that conditions are rough if the position error is repeatedly large each time it is calculated. The control module 16 may command all the marine propulsion devices in the plurality of marine propulsion devices to produce thrust in response to rough external conditions. On the other hand, the control module 16 may command only the first (or second) subset of marine propulsion devices in the plurality of marine propulsion devices to produce thrust in response to calm external conditions.

Thus far, examples of the present method have been described with respect to the marine vessel of FIG. 2, which has two propulsion devices 12, 14 coupled thereto. However, as noted herein above, the present method can also be implemented with three, four, or more propulsion devices. Examples of the method used with three and four propulsion devices will now be described, although the principles referred to herein below can be extrapolated to propulsion systems with more than four marine propulsion devices.

Figure 5:
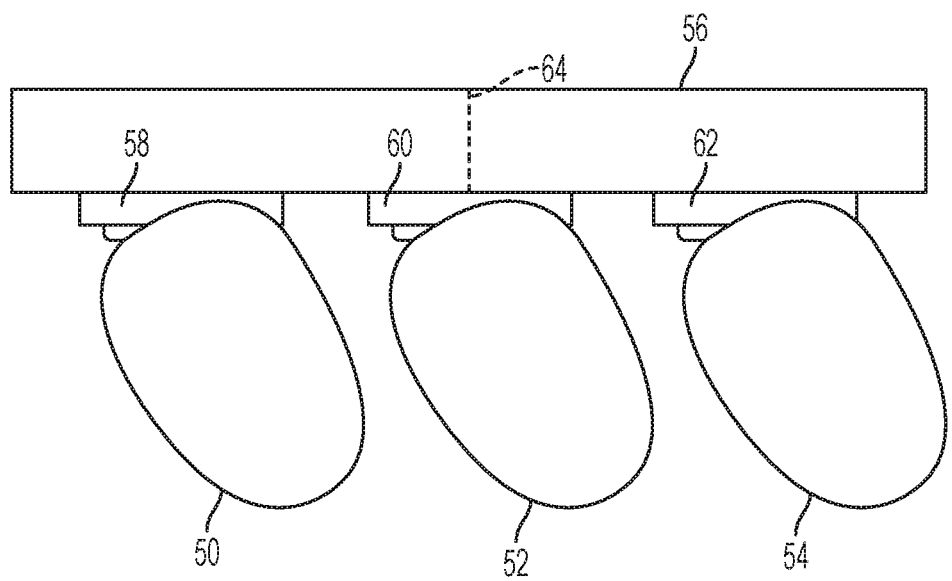
FIG. 5 illustrates a transom of a marine vessel with three propulsion devices.

FIG. 5 shows an example in which the plurality of marine propulsion devices comprises three marine propulsion devices, including two outer marine propulsion devices 50, 54 and one inner marine propulsion device 52 between the two outer marine propulsion devices 50, 54. The marine propulsion devices 50, 52, 54 are coupled to the transom 56 of the vessel 10 by way of transom brackets 58, 60, 62, and are symmetrical with respect to a centerline 64 of the transom 56. In one example, the first subset of marine propulsion devices referred to herein above comprises only the inner marine propulsion device 52. Thus, when the control module 16 determines that only the first subset of marine propulsion devices should produce thrust, because the error is only in the fore/aft direction of the vessel 10, the error is below the threshold, and/or external conditions are calm, the control module 16 will actuate only the inner marine propulsion device 52 to produce thrust. This results in finer control than if all three marine propulsion devices 50, 52, 54 were actuated to produce thrust to correct the error. During a second iteration of control, the control module 16 would again actuate only the inner propulsion device 52, as it is along the centerline 64 of the transom 56 and therefore will not induce any rotation of the vessel 10 that would otherwise require correction. In another example, the first subset of marine propulsion devices is one of the outer propulsion devices 50 or 54, and the second subset is the other of the outer marine propulsion devices 54 or 50, and the control module 16 alternates between commanding the first and second subsets of the plurality of marine propulsion devices to produce thrust as noted herein above. In still another example, the first subset of marine propulsion devices comprises both of the outer propulsion devices 50, 54, which the control module 16 actuates together to produce less thrust than if all three marine propulsion devices 50, 52, 54 were actuated. Actuating both outer propulsion devices 50, 54 at the same time would eliminate the need to counteract any yaw induced by alternating their actuation.

Figure 6:
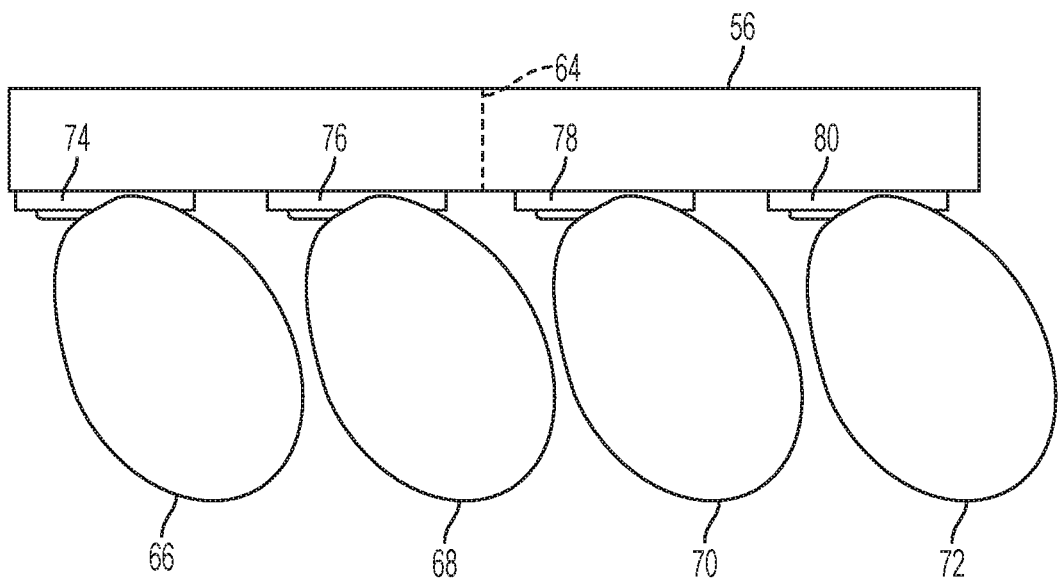
FIG. 6 illustrates a transom of a marine vessel with four propulsion devices.

FIG. 6 illustrates an example in which the plurality of marine propulsion devices comprises four marine propulsion devices, including two outer marine propulsion devices 66, 72 and two inner marine propulsion devices 68, 70 between the two outer marine propulsion devices 66, 72. The marine propulsion devices 66, 68, 70, 72 are coupled to the transom 56 of the vessel 10 by way of transom brackets 74, 76, 78, 80, respectively, and are spaced symmetrically with respect to the transom's centerline 64. According to one example of the present disclosure, the first subset comprises one of the two inner propulsion devices 68 or 70, and the second subset comprises the other of the two inner propulsion devices 70 or 68. Because the inner marine propulsion devices 68, 70 are offset from the centerline 64, if one only one of them produces thrust at a time, a yaw moment will be induced on the vessel 10 and the vessel 10 will rotate. Therefore, the control module 16 alternates between commanding the first and second subsets of the plurality of marine propulsion devices to produce thrust as noted herein above, in order to correct such induced yaw. Because the inner marine propulsion devices 68, 70 are offset symmetrically with respect to the centerline 64, their moment arms are the same, and the moment their thrust induces during each iteration of control will be the same.

Actuating only the inner propulsion devices 68, 70 in an alternating sequence may be desirable, as their moment arms are less than those of the outer propulsion devices 66, 72. If the control module 16 determined that a greater yaw correction was needed in order to minimize heading error, the control module 16 might choose to actuate only one of the outer propulsion devices 66 or 72, depending on which way the vessel 10 needed to rotate. In other examples, the first subset of marine propulsion devices comprises both the inner propulsion devices 68 and 70, which the control module 16 would actuate together to produce less thrust than if all four marine propulsion devices 66, 68, 70, 72 were to be actuated. In this case, no alternating sequence would be required, as the inner propulsion devices 68, 70 are symmetrical with respect to the centerline 64 and are both producing the same magnitude and direction of thrust together. Actuating both inner propulsion devices 68, 70 at the same time eliminates the need to counteract any yaw induced by alternating their actuation.

Note that similar principles used for a vessel with three propulsion devices could be applied to a vessel with five, seven, or an odd number of propulsion devices greater than one, wherein only the center propulsion device could be actuated; the two propulsion devices just to port and starboard of the center propulsion device could be actuated in an alternating pattern; any two of the propulsion devices situated symmetrically with respect to the vessel's centerline 64 could be actuated at once; etc. Note that similar principles used for a vessel with four propulsion devices could be applied to a vessel with six, eight, or an even number of propulsion devices greater than two, wherein only the two innermost propulsion devices could be actuated in an alternating pattern; both of the two innermost propulsion devices could be actuated at once; any two of the propulsion devices situated symmetrically with respect to the vessel's centerline 64 could be actuated at once; etc.

In either of the examples of FIGS. 5 and 6, the control module 16 may choose to actuate the first subset of marine propulsion devices to produce thrust in one direction, while actuating the second subset to produce thrust in the opposite direction. So long as the thrust produced by the first subset is greater than that produced by the second subset, the vessel 10 will move in the direction of the first subset's thrust, but more slowly than if all propulsion devices were actuated to produce thrust in that direction. In another example, the control module 16 may actuate all propulsion devices to produce thrust in the same direction, but may trim one or more of the marine propulsion devices up, such that the thrust the trimmed devices produce is less than it would otherwise be were it to be directed perpendicularly with respect to the vessel 10.

Figure 7:
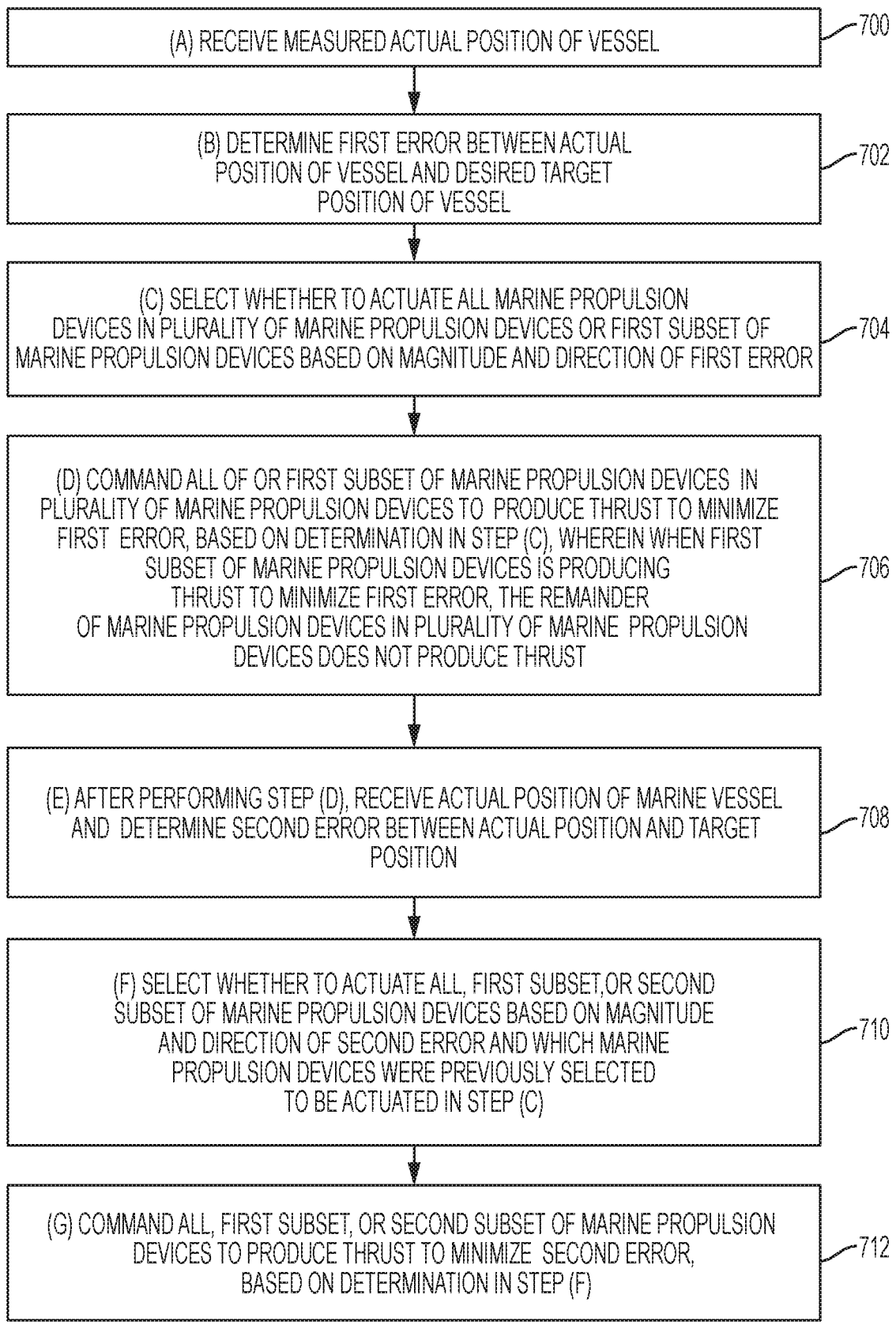
FIG. 7 illustrates another example of a method for positioning a marine vessel according to the present disclosure.

FIG. 7 illustrates another method according to the present disclosure for positioning a marine vessel 10 powered by a marine propulsion system 20 including a plurality of marine propulsion devices, the method being carried out by a control module 16 in communication with the marine propulsion system 20. The method includes:
(a) receiving a measured actual position AP of the vessel 10, as shown at 700;
(b) determining a first error between the actual position AP of the vessel 10 and a desired target position TP of the vessel 10, as shown at 702;
(c) selecting whether to actuate all marine propulsion devices in the plurality of marine propulsion devices or a first subset of marine propulsion devices in the plurality of marine propulsion devices based on a magnitude and a direction of the first error, as shown at 704; and
(d) commanding all of or the first subset of marine propulsion devices in the plurality of marine propulsion devices to produce thrust to minimize the first error, based on the determination in step (c), as shown at 706.

According to the present example, when the first subset of marine propulsion devices is producing thrust to minimize the first error, a remainder of the marine propulsion devices in the plurality of marine propulsion devices does not produce thrust.

As noted herein above, the control module 16 may select whether to actuate all or the first subset of marine propulsion devices based on a state of external conditions and/or the magnitude of the position error. Thus, the method may also include determining a state of external conditions acting on the vessel 10, and step (c) may comprise selecting to actuate all the marine propulsion devices in the plurality of marine propulsion devices in response to rough external conditions. Alternatively, step (c) may comprise selecting to actuate the first subset of marine propulsion devices in the plurality of marine propulsion devices in response to calm external conditions. Additionally or alternatively, the method may include comparing the magnitude of the first error between the actual position AP and the target position TP to an error threshold, and step (c) may comprise selecting to actuate all the marine propulsion devices in the plurality of marine propulsion in response to the magnitude of the first error being greater than the error threshold. Alternatively, step (c) may comprise selecting to actuate the first subset of marine propulsion devices in the plurality of marine propulsion devices in response to the magnitude of the first error being less than the error threshold. In these ways, less thrust may be produced when conditions are calm and/or when the magnitude of the position error is small, and fine correction is therefore needed.

As noted herein above, the control module 16 may command all of or the first subset of marine propulsion devices, as appropriate, to cease producing thrust after performing step (d). Step (d) may include commanding all of or the first subset of marine propulsion devices to produce thrust for a predetermined period of time, which may be determined as noted herein above. The control module 16 may command throttle valves of engines of all of or the first subset of marine propulsion devices, as appropriate, to open to idle positions while performing step (d).

Still referring to FIG. 7, the method may further include the following steps:
- (a) after performing step (d), receiving the actual position AP of the marine vessel 10 and determining a second error between the actual position and the target position, as shown at 708;
- (b) selecting whether to actuate all marine propulsion devices in the plurality of marine propulsion devices, the first subset of marine propulsion devices in the plurality of marine propulsion devices, or a second subset of marine propulsion devices in the plurality of marine propulsion devices based on a magnitude and a direction of the second error and which marine propulsion devices were previously selected to be actuated in step (c), as shown at 710; and
- (c) commanding all of, the first subset of, or the second subset of marine propulsion devices in the plurality of marine propulsion devices to produce thrust to minimize the second error, based on the determination in step (f), as shown at 712.

In some examples, in response to step (c) comprising selecting to actuate the first subset of marine propulsion devices and the second error having the same direction as the first error, step (f) comprises selecting to actuate the second subset of marine propulsion devices. This way, any rotation induced by actuating only the first subset of marine propulsion devices during the first iteration of control is corrected during the second iteration of control by actuation of the second subset of marine propulsion devices. However, if the second error is in the opposite direction of the first error, this indicates that the vessel 10 has overshot the target position TP. In this instance, the control module 16 may cease attempting to correct the error until after the error increases above a certain value, or the control module 16 may actuate the first subset of propulsion devices again, but in the opposite direction, in order to counteract the yaw produced during the first iteration of control.

In some examples, step (c) comprises selecting to actuate the first subset of marine propulsion devices in the plurality of marine propulsion devices in response to the direction of the first error being only in a fore/aft direction of the vessel 10. This is for the reasons described hereinabove related to the ease of fore/aft movement versus left/right movement. Note that because the present methods work better in calm conditions, they are not as concerned with correcting any heading error, which is generally induced by external factors acting on the vessel 10. Rather, the present method are intended to correct yaw produced during each iteration of control by virtue of the fact that thrust from only one propulsion device that is offset from the centerline CL of the vessel 10 will cause a moment to act on the vessel 10. If any left/right error correction is in fact needed, in the examples in which three or four marine propulsion devices are provided on the vessel 10, it may be desirable to use only two of the propulsion devices to make left/right corrections, so long as those two propulsion devices can produce enough thrust together to move the vessel 10.

Note that in the above examples, the control module 16 can affect thrust production by the propulsion devices 12, 14, 50, 52, 54, 66, 68, 70, 72 by turning their engines on or off, shifting the propulsion devices' power transmission mechanisms to different positions, or otherwise engaging or disengaging the shafts holding the propellers, impellers, or propulsors from the engines or other prime movers. To control a direction of the thrust, the control module 16 may control the gear state of the transmissions or may control reversing buckets or like deflectors that alter the direction of thrust with respect to the vessel 10. In the example in which the marine propulsion devices do have transmissions, the life of the transmissions can be increased and NVH can be optimized by not shifting all marine propulsion devices together at once in order to correct position error.

As mentioned briefly herein above, the present methods also aid in auto-docking algorithms by reducing the likelihood that when the marine vessel 10 gets too close to the target position TP it will oscillate between positions near, but not on, the target position TP. During auto-docking, it is undesirable to have such oscillation, as this will cause the vessel to hit the dock or other object of interest. By using a timed shift event and monitoring/re-measuring process, the present algorithm slows the vessel's docking movements and prevents such oscillation. Moving the marine vessel 10 with the thrust of only a subset of all available marine propulsion devices ensures that the propulsion system 20 is able to precisely carry out the movement requested of it.

In the above description certain terms have been used for brevity, clarity and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A method for positioning a marine vessel powered by a marine propulsion system including a plurality of marine propulsion devices, the method being carried out by a control module in communication with the marine propulsion system and comprising:
   - receiving a measured actual position of the vessel;
   - determining a first error between the actual position of the vessel and a desired target position of the vessel;
   - in response to the first error being in a fore/aft direction of the vessel, commanding a first subset of marine propulsion devices in the plurality of marine propulsion devices to produce thrust to minimize the first error in the fore/aft direction, while a remainder of the marine propulsion devices in the plurality of marine propulsion devices do not produce thrust;
   - thereafter commanding the first subset of marine propulsion devices to cease producing thrust;
   - thereafter receiving the actual position of the vessel and determining a second error between the actual position and the target position;
   - in response to the second error being in the fore/aft direction, commanding a second subset of marine propulsion devices in the plurality of marine propulsion devices to produce thrust to minimize the second error in the fore/aft direction; and
   - further comprising alternating between commanding the first and second subsets of marine propulsion devices to produce thrust to minimize any remaining error between the actual position and the target position.

2. The method of claim 1, wherein the plurality of marine propulsion devices comprises two marine propulsion devices, the first subset comprises one of the two marine propulsion devices, and the second subset comprises the other of the two marine propulsion devices.

3. The method of claim 1, wherein the plurality of marine propulsion devices comprises an even number of at least four marine propulsion devices, including two outer marine propulsion devices and two inner marine propulsion devices between the two outer marine propulsion devices, the first subset comprises one of the two inner marine propulsion devices, and the second subset comprises the other of the two inner marine propulsion devices.

4. The method of claim 1, wherein the plurality of marine propulsion devices comprises an odd number of at least three marine propulsion devices, including two outer marine propulsion devices and one inner marine propulsion device between the two outer marine propulsion devices, and the first subset comprises only the inner marine propulsion device.

5. The method of claim 1, further comprising commanding the first subset of marine propulsion devices to produce thrust for a predetermined period of time before commanding the first subset of marine propulsion devices to cease producing thrust.

6. The method of claim 1, further comprising commanding throttle valves of engines of the first subset of marine propulsion devices to open to idle positions while commanding the first subset of marine propulsion devices to shift into forward or reverse gear to produce thrust.

7. The method of claim 1, further comprising:
comparing the first error between the actual position and the target position to an error threshold; and
commanding all marine propulsion devices in the plurality of marine propulsion devices to produce thrust in response to the first error being greater than the error threshold; and
commanding the first subset of marine propulsion devices to produce thrust in response to the first error being less than the error threshold.

8. The method of claim 1, further comprising:
determining a state of external conditions acting on the vessel;
commanding all marine propulsion devices in the plurality of marine propulsion devices to produce thrust in response to rough external conditions; and
commanding the first subset of marine propulsion devices to produce thrust in response to calm external conditions.

9. A method for positioning a marine vessel powered by a marine propulsion system including a plurality of marine propulsion devices, the method being carried out by a control module in communication with the marine propulsion system and comprising:
(a) receiving a measured actual position of the vessel;
(b) determining a first error between the actual position of the vessel and a desired target position of the vessel;
(c) selecting whether to actuate all marine propulsion devices in the plurality of marine propulsion devices or a first subset of marine propulsion devices in the plurality of marine propulsion devices based on a magnitude and a direction of the first error; and
(d) commanding all of or the first subset of marine propulsion devices in the plurality of marine propulsion devices to produce thrust to minimize the first error, based on the determination in step (c);
wherein when the first subset of marine propulsion devices is producing thrust to minimize the first error, a remainder of the marine propulsion devices in the plurality of marine propulsion devices does not produce thrust; and
wherein step (c) comprises selecting to actuate the first subset of marine propulsion devices in response to the direction of the first error being only in a fore/aft direction of the vessel.

10. The method of claim 9, further comprising:
(e) after performing step (d), receiving the actual position of the vessel and determining a second error between the actual position and the target position;
(f) selecting whether to actuate all marine propulsion devices in the plurality of marine propulsion devices, the first subset of marine propulsion devices in the plurality of marine propulsion devices, or a second subset of marine propulsion devices in the plurality of marine propulsion devices based on a magnitude and a direction of the second error and which marine propulsion devices were previously selected to be actuated in step (c); and
(g) commanding all of, the first subset of, or the second subset of marine propulsion devices in the plurality of marine propulsion devices to produce thrust to minimize the second error, based on the determination in step (f).

11. The method of claim 10, wherein in response to step (c) comprising selecting to actuate the first subset of marine propulsion devices and the second error having the same direction as the first error, step (f) comprises selecting to actuate the second subset of marine propulsion devices.

12. The method of claim 9, further comprising commanding all of or the first subset of marine propulsion devices to cease producing thrust after performing step (d).

13. The method of claim 12, wherein step (d) further comprises commanding all of or the first subset of marine propulsion devices to produce thrust for a predetermined period of time.

14. The method of claim 9, further comprising commanding throttle valves of engines of all of or the first subset of marine propulsion devices to open to idle positions while performing step (d).

15. The method of claim 9, further comprising determining a state of external conditions acting on the vessel;
wherein step (c) comprises selecting to actuate all marine propulsion devices in the plurality of marine propulsion devices in response to rough external conditions; and
wherein step (c) comprises selecting to actuate the first subset of marine propulsion devices in response to calm external conditions.

16. The method of claim 9, further comprising comparing the magnitude of the first error to an error threshold;
wherein step (c) comprises selecting to actuate all marine propulsion devices in the plurality of marine propulsion devices in response to the magnitude of the first error being greater than the error threshold; and
wherein step (c) comprises selecting to actuate the first subset of marine propulsion devices in response to the magnitude of the first error being less than the error threshold.

17. The method of claim 10, wherein the plurality of marine propulsion devices comprises two marine propulsion devices, the first subset comprises one of the two marine propulsion devices, and the second subset comprises the other of the two marine propulsion devices.

18. A method for positioning a marine vessel powered by a marine propulsion system including a plurality of marine propulsion devices, the method being carried out by a control module in communication with the marine propulsion system and comprising:

receiving a measured actual position of the vessel;

determining a first error between the actual position of the vessel and a desired target position of the vessel;

in response to the first error being in a fore/aft direction of the vessel, commanding a first subset of marine propulsion devices in the plurality of marine propulsion devices to produce thrust to minimize the first error in the fore/aft direction while a remainder of the marine propulsion devices in the plurality of marine propulsion devices do not produce thrust;

thereafter commanding the first subset of marine propulsion devices to cease producing thrust;

thereafter receiving the actual position of the vessel and determining a second error between the actual position and the target position; and in response to the second error being in the fore/aft direction, commanding a second subset of marine propulsion devices in the plurality of marine propulsion devices to produce thrust to minimize the second error in the fore/aft direction;

wherein the plurality of marine propulsion devices comprises an even number of at least four marine propulsion devices, including two outer marine propulsion devices and two inner marine propulsion devices between the two outer marine propulsion devices, the first subset comprises one of the two inner marine propulsion devices, and the second subset comprises the other of the two inner marine propulsion devices.

19. A method for positioning a marine vessel powered by a marine propulsion system including a plurality of marine propulsion devices, the method being carried out by a control module in communication with the marine propulsion system and comprising:

receiving a measured actual position of the vessel;

determining a first error between the actual position of the vessel and a desired target position of the vessel;

in response to the first error being in a fore/aft direction of the vessel, commanding a first subset of marine propulsion devices in the plurality of marine propulsion devices to produce thrust to minimize the first error in the fore/aft direction while a remainder of the marine propulsion devices in the plurality of marine propulsion devices do not produce thrust; and thereafter commanding the first subset of marine propulsion devices to cease producing thrust;

wherein the plurality of marine propulsion devices comprises an odd number of at least three marine propulsion devices, including two outer marine propulsion devices and one inner marine propulsion device between the two outer marine propulsion devices, and the first subset comprises only the inner marine propulsion device.

\* \* \* \* \*